United States Patent [19]
Guyer

[11] Patent Number: 5,079,445
[45] Date of Patent: Jan. 7, 1992

[54] HIGH OUTPUT COUPLING CAVITY DESIGN FOR OPTICAL PARAMETRIC OSCILLATORS

[75] Inventor: Dean R. Guyer, Bellevue, Wash.
[73] Assignee: Amoco Corporation, Chicago, Ill.
[21] Appl. No.: 553,863
[22] Filed: Jul. 17, 1990
[51] Int. Cl.⁵ .............................................. H03F 7/00
[52] U.S. Cl. ..................................... 359/330; 372/21; 372/108
[58] Field of Search .................. 307/425, 428; 372/21, 372/108, 97

[56] References Cited
U.S. PATENT DOCUMENTS
4,920,541 4/1990 Baumgartner et al. ............... 372/20

Primary Examiner—James W. Davie
Attorney, Agent, or Firm—Seed and Berry

[57] ABSTRACT

A cavity design for use with a nonlinear medium which may be used as an oscillator using pump energy with frequency (FP) interacting with the nonlinear medium for parametrically generating outputs having a signal frequency (FS) and an idler frequency (FI) which satisfy the relationship $FP=FS+FI$. The cavity consists of optics and optical elements that minimize the buildup of intracavity intensity at either of the parametrically waves being generated, creating a condition in which the optical cavity is non-resonant for both the signal and idler frequencies.

44 Claims, 4 Drawing Sheets

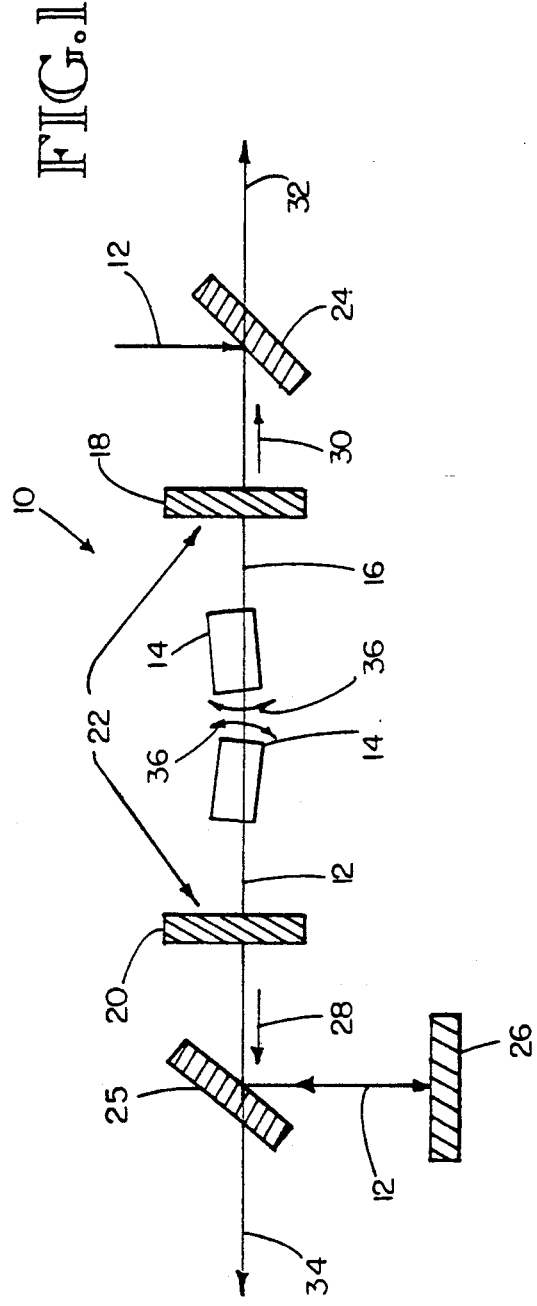

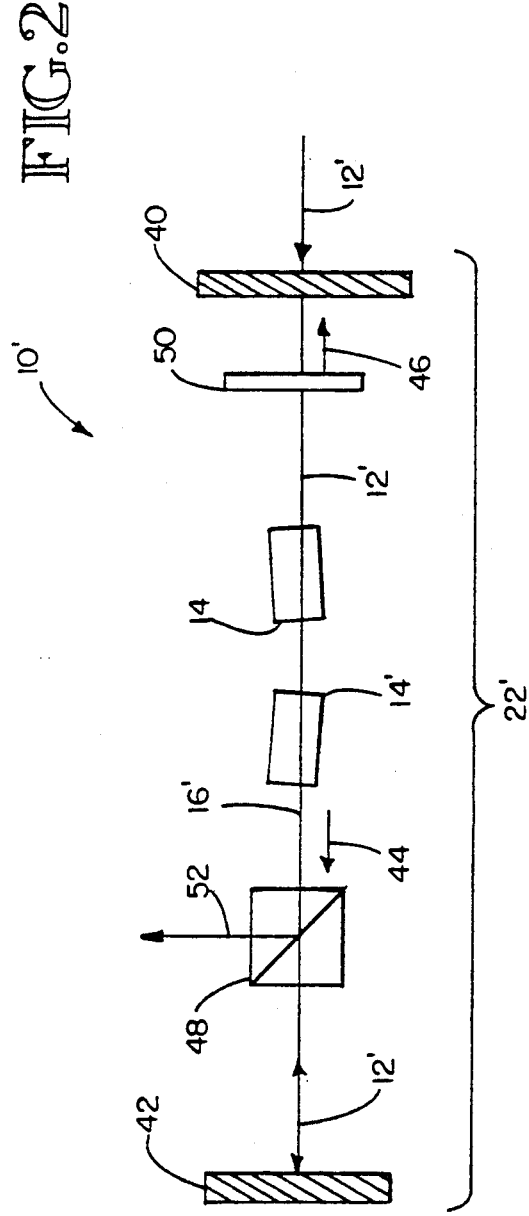

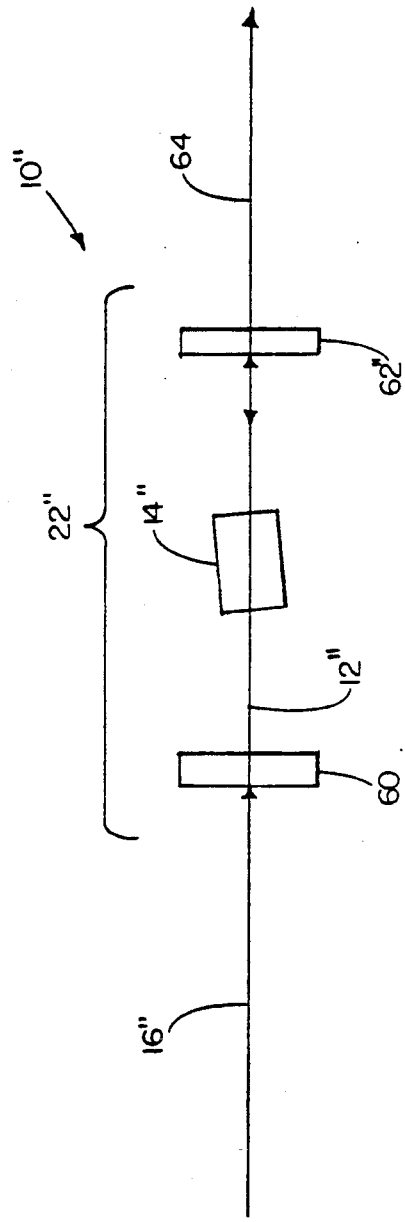

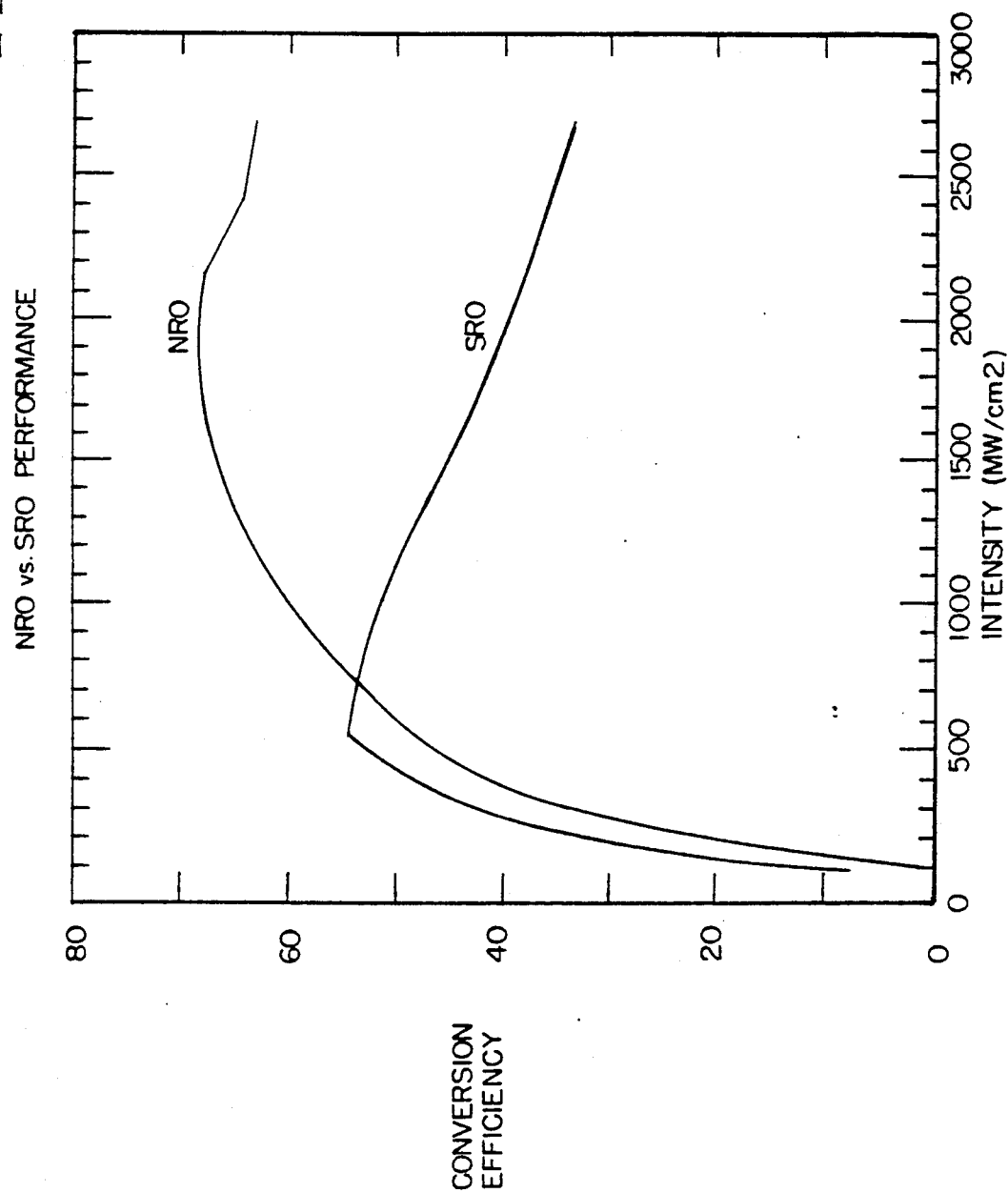

HIGH OUTPUT COUPLING CAVITY DESIGN FOR OPTICAL PARAMETRIC OSCILLATORS

TECHNICAL FIELD

The present invention relates generally to optical resonators, and more particularly, to optical resonators for parametric oscillators.

BACKGROUND OF THE INVENTION

Parametric amplification is the amplification of light (the "signal" and "idler" light energies) at two frequencies at the expense of light (the "pump" light) at another frequency. Parametric amplification is generally accomplished by directing a beam of the pump light onto a nonlinear medium. Two types of optical cavities have been used in practice to increase the gain obtainable from the nonlinear medium by parametric amplification. These resonator types are termed singly and doubly resonant oscillators (SRO and DRO, respectively). By maintaining a strong feedback at one or more of the frequencies being generated by the parametric process, the conversion efficiency of the pump beam energy into energy at the two generated waves can be increased at energy pump intensities significantly lower than are required for simple optical parametric generation where no cavity structure is used.

The addition of an optical cavity reduces the effective gain bandwidth of the nonlinear medium to frequencies that are resonant with the mode or modes of the cavity. The doubly resonant oscillator typically displays instabilities in operation, since it is overconstrained by the phase restrictions introduced by requiring that the cavity be resonant at the frequencies of both the signal and idler energies.

The instabilities of the doubly resonant oscillator are overcome in the singly resonant oscillator by using a cavity that is resonant at only one of the generated signal and idler frequencies. In the singly resonant oscillator, the frequency of the energy at one frequency is fixed by the resonant cavity while the energy at the other frequency is not resonated and is free to compensate for phase and frequency changes in the pump source.

While the singly resonant oscillator does not have the instability inherent in the doubly resonant oscillator, it does have the drawback that its performance is optimized for only one of the two generated waves. Intracavity losses and the increased photon residence time in the cavity at the resonated wave are responsible for this effect.

One major drawback presented by both the singly and doubly resonant oscillators is that their performances are fairly sharply peaked functions of incident pump intensity. At pump intensities below this peak, their conversion efficiencies increase rapidly with increasing pump intensity due to the feedback offered by the resonant cavity. As the pump intensity is increased above this peak, this feedback increasingly serves to drive the process in reverse and the efficiency of conversion decreases. This sensitivity to variation in incident pump intensity contrains the conditions under which single and doubly resonant oscillators can be efficiently operated.

SUMMARY OF THE INVENTION

It is, accordingly, a principal object of the present invention to provide a parametric oscillator that is non-resonant for both frequencies being parametrically generated.

This object is achieved by a non-resonant optical parametric oscillator for producing optical signal energy having a signal frequency from optical pump energy having a pump frequency. The oscillator comprises an optical cavity and a nonlinear optical medium placed in the optical cavity. The optical cavity of the present invention has an optical axis aligned in first and second opposing directions and is transmissive to energy at the signal frequency and to energy at an idler frequency. In addition, the nonlinear optical medium placed in the optical cavity on the optical axis receives the optical pump energy and generates energy along the optical axis at the signal frequency and the idler frequency. The generated signal energy is transmitted in the first direction and then in the second direction and the generated energy at the idler frequency is transmitted in the second direction and then in the first direction.

In another aspect the optical cavity has an optical axis and is non-resonant with energy at the signal and pump frequencies. The nonlinear optical medium is placed on the optical axis for receiving the optical pump energy. It produces energy along the optical axis at the signal frequency and the idler frequency.

BRIEF DESCRIPTION OF THE DRAWINGS

The invention will be more fully understood and appreciated from the following detailed description taken in conjunction with the drawings, in which:

FIG. 1 is a schematic diagram of a first embodiment of a parametric oscillator constructed in accordance with the invention.

FIG. 2 is a schematic diagram of a second embodiment of a parametric oscillator constructed in accordance with the invention.

FIG. 3 is a schematic diagram of a third embodiment of a parametric oscillator constructed in accordance with the invention.

FIG. 4 is a graph comparing the calculated conversion efficiency of a non-resonant oscillator according to the present invention to a single resonant oscillator, as a function of pump energy intensity.

DETAILED DESCRIPTION OF THE INVENTION

According to the invention, the performance of an optical parametric oscillator is improved by using optics and optical elements as a cavity that minimize the buildup in the cavity of the signal and idler energy being parametrically generated. Such an oscillator resonates neither signal nor idler energy waves, thereby causing the cavity to be non-resonant. The non-resonant oscillator of the present invention overcomes the limitations of the singly resonant and doubly resonant cavities of the prior art.

FIG. 1 is a schematic diagram of a first embodiment of an optical parametric oscillator 10 constructed in accordance with the invention. The optical parametric oscillator 10 includes a pump laser source (not shown) that transmits pulses of optical energy along a pump path 12. The pump energy has a pump frequency (FP). As an example, the pump laser source can produce light with a wavelength of 532 nm. It also includes one or more nonlinear media 14 (such as crystals of $\beta$-barium borate or potassium titanyl phosphate) placed along an optical axis 16. The pump path 12 passes through the nonlinear medium 14.

The optical parametric oscillator 10 further comprises a mirror 18 that is highly transmissive for energy at the idler frequency (FI) and highly reflective for energy at the signal frequency (FS), and a mirror 20 that is highly reflective for energy at FI and highly transmissive for energy at FS. For purposes of this disclosure, a mirror is called highly transmissive if its transmission factor is greater than or equal to 85 percent, and preferably greater than 85 percent. The pump energy passes back along the optical axis 16 through the cavity 22 defined by the mirrors 18 and 20 by means of reflectors 24, 25 and 26. By causing the pump energy to pass in the two directions indicated by the oppositely-directed arrows 28 and 30 along the optical axis 16 through the cavity 22 and the nonlinear medium 14, parametric generation of energy at the signal frequency FS and energy at the idler frequency FI occurs in both directions. If desired, one or both of the reflectors 24 and 25 can be placed inside the cavity 22 along the optical axis 16, so long as the pump energy along the pump path 12 passes through the nonlinear medium 14.

Amplification of the energy at the parametric frequencies FS and FI thereby occurs in a hand-to-hand fashion: amplification of the energy at the signal frequency FS in the direction indicated by the arrow 28 is accompanied by an equal photon growth of the energy at the idler frequency FI; and in the direction indicated by the arrow 30, amplification of the energy at the idler frequency FI is accompanied by an equal photon growth of the energy at the signal frequency FS. The amplified optical energy at idler frequency FI exits through the mirror 18 along the path 32 and the amplified optical energy at signal frequency FS exits through mirror 20 along the path 34. Reflectors 24 and 25 are chosen such that they reflect energy at the pump frequency FP along the pump path 12 and transmits energy at both the signal frequency FS and the idler frequency FI.

In this first preferred embodiment, the nonlinear medium 14 is the tuning element of the non-resonant parametric oscillator 10. The nonlinear medium 14 can either be pivotally mounted such that the frequency selection is accomplished by angular adjustment of the nonlinear medium 14 with respect to the propagation directions of the pump energy at pump frequency FP along the pump path 12 as indicated by the curved arrows 36, or affixed in a single orientation and tuned by modifying the environment in a manner that changes the phase matching properties of the nonlinear medium.

FIG. 2 is a schematic diagram of a second embodiment of a parametric oscillator constructed in accordance with the invention. FIG. 2 illustrates another non-resonant parametric oscillator 10' for optical parametric generation in which the different polarizations of the signal and idler energies inherent for type II phase matching in birefringent crystals are used to cause the non-resonant condition. The optical energy at the pump frequency FP enters the parametric oscillator 10' along the pump path 12' through the mirror 40, passes through the oscillator cavity 22', and then is back-reflected through the oscillator cavity 22' by the mirror 42. Parametric generation of the optical energy at the signal and idler frequencies (FS and FI, respectively) thereby occurs in both directions indicated by the arrows 44 and 46 along the optical axis 16' in the nonlinear medium 14'. Both of the mirrors 40 and 42 are chosen to be highly reflective to optical energy at both signal and idler frequencies, FS and FI.

The oscillator cavity 22' can include a polarization selective beam splitter 48 and a polarization rotator 50. Without the polarization rotator 50, which could be either a waveplate or polarization rhomb, optical energy at one of the generated frequencies (FS or FI) would be able to pass through the polarization selective beam splitter 48, and the optical energy at the other frequency would be reflected out of the parametric oscillator 10'. This would result in singly resonant operation of the parametric oscillator 10'. With the inclusion of a polarization rotator 50, chosen such that the polarizations of the energies at both pump frequency FP and idler frequency FI are rotated by 90° after passing through the polarization rotator 50 twice, the polarization orientation of energy at both the signal frequency FS and the idler frequency FI would be interchanged after each round-trip pass through the oscillator cavity 22'. Thus, the optical energy at the generated frequency (FS or FI) that was able to pass through the beam splitter 48 on the first pass would be coupled out of the oscillator cavity 22' by the beam splitter 48 on the second pass. The interchange of the polarization orientations of the optical energies at the two generated frequencies FS and FI caused on each round-trip pass through the oscillator cavity 22' by polarization rotator 50 causes optical energy at neither generated frequency to be resonated by the oscillator cavity 22'. Hence the oscillator cavity 22' is considered non-resonant for both the signal frequency FS and the idler frequency FI. This cavity design is an improvement in that it allows optical energy at both the generated signal frequency FS and the generated idler frequency FI to be extracted from the oscillator cavity 22' along the path 52, by the beam splitter 48, with the same polarization.

FIG. 3 is a schematic diagram of a third embodiment of a parametric oscillator constructed in accordance with the invention. FIG. 3 illustrates still another parametric oscillator 10" for optical parametric generation which is considered non-resonant for both energy at the signal frequency FS and energy to the idler frequency FI. The pump beam at the pump frequency FP enters the oscillator cavity 22" through cavity mirror 60, and after passing through a nonlinear medium 14" is back reflected through the oscillator cavity 22" by another cavity mirror 62". Cavity mirror 60 is chosen such that it is highly reflective for optical energy at both the signal and idler frequencies (FS and FI), while the cavity mirror 62" is chosen to be maximally transmissive for optical energy at both FS and FI. Hence optical energy at both the signal frequency FS and the idler frequency FI exits from the oscillator cavity 22" from the same optic element (cavity mirror 12") along the path 64.

Parametric amplification occurs in the oscillator cavity 22" due to the unavoidable small degree of reflection of optical energy at the two generated frequencies FS and FI by the mirror 62" back into the oscillator cavity 22". This small amount of reflection occurs in the mirror 62" since optics that are perfectly transmissive are not possible to manufacture. Since the mirror 62" does transmit optical energy at both the signal frequency FS and the idler frequency FI to a high degree, the cavity is not resonant for optical energy at either generated frequency FS or FI, by scientifically accepted definitions, and hence is non-resonant.

FIG. 4 is a graph comparing the calculated conversion efficiency of a non-resonant oscillator according to the present invention to a single resonant oscillator, as a function of pump energy intensity. The NRO upon which the calculations are based is of the form of the first embodiment, shown in FIG. 1. This NRO has two crystals of β-barium borate, each 7 mm long, with a city mirror spacing of 34 mm, and a pump pulse length of 7.5 ns. Mirror 20, the left hand mirror in FIG. 1, was assumed to have a transmission factor of 90 percent for the signal energy and a transmission factor of 2 percent for the idler energy. Mirror 18, the right hand mirror in FIG. 1 was assumed to have a transmission factor of 2 percent for the signal energy and a transmission factor of 90 percent for the idler energy. The SRO whose performance is compared in FIG. 4 is like the NRO described above, except that the two mirrors are identical, having a transmission factor of 15 percent for the signals energy and a transmission factor of 90 percent for the idler energy. For pump energy intensities of greater than approximately 700 mW/cm$^2$, the non-resonant oscillator (NRO) has a greater conversion efficiency than the SRO, and the conversion efficiency of the NRO reaches nearly 70 percent, at a pump energy intensity of approximately 1900 mW/cm$^2$.

While the detailed description above has been expressed in terms of specific examples, those skilled in the art will appreciate that many other embodiments of the invention could be used to accomplish the purpose of the disclosed invention. Accordingly, it can be appreciated that various modifications of the above-described embodiments may be made without departing from the spirit and the scope of the invention. Therefore, the spirit and the scope of the present invention are to be limited only by the following claims.

What is claimed is:

1. A non-resonant optical parametric oscillator for producing optical signal energy having a signal frequency from optical pump energy having a pump frequency, comprising:
   an optical cavity including first and second optical elements at respective first and second ends thereof and having an optical axis aligned in first and second opposing directions between the ends, the optical cavity being transmissive to energy at the signal frequency and to energy at an idler frequency, the idler frequency being the difference between the pump frequency and the signal frequency; and
   a nonlinear optical medium placed in the optical cavity on the optical axis for receiving the optical pump energy and producing energy along the optical axis at the signal frequency and the idler frequency, the signal energy being transmitted in the first direction and then in the second direction and the energy at the idler frequency being transmitted in the second direction and then in the first direction.

2. The non-resonant optical parametric oscillator of claim 1 wherein the pump energy is transmitted through the nonlinear optical medium in one of the two directions and then in the other of the two directions.

3. The non-resonant optical parametric oscillator of claim 1, the optical cavity further including outcoupling means on the optical axis for coupling the energy at the signal frequency and the idler frequency from the optical cavity.

4. The non-resonant optical parametric oscillator of claim 3 wherein the outcoupling means comprises means for outcoupling optical energy having a predetermined polarization.

5. The non-resonant optical parametric oscillator of claim 4, further comprising means for rotating the polarization of optical energy at the signal frequency and the idler frequency by ninety degrees.

6. The non-resonant optical parametric oscillator of claim 3 wherein the outcoupling means comprises the first and second optical elements, the first optical element further being reflective for the signal energy and being transmissive for energy at the the idler frequency, and the second optical element further being reflective for energy at the idler frequency and being transmissive for the signal energy.

7. The non-resonant optical parametric oscillator of claim 6 wherein the first and second optical elements are highly transmissive to the optical pump energy.

8. The non-resonant optical parametric oscillator of claim 3 wherein the outcoupling means comprises the first and second optical elements, the first optical element further being reflective for the signal energy and the idler frequency, and the second optical element further being transmissive for energy at the idler frequency and the signal energy.

9. The non-resonant optical parametric oscillator of claim 8 wherein the first and second optical elements are highly transmissive to the optical pump energy.

10. The non-resonant optical parametric oscillator of claim 3 wherein the outcoupling means comprises means for outcoupling optical energy having a predetermined polarization.

11. The non-resonant optical parametric oscillator of claim 10, further comprising means for rotating the polarization of optical energy at the signal frequency and the idler frequency by ninety degrees.

12. The non-resonant optical parametric oscillator of claim 8 wherein the first and second optical elements are highly transmissive to the optical pump energy.

13. A non-resonant optical parametric oscillator for producing optical signal energy having a signal frequency from optical pump energy having a pump frequency, comprising:
   an optical cavity including first and second optical elements at respective first and second ends thereof and having an optical axis between the ends, the optical cavity being non-resonant with energy at the signal frequency and energy at an idler frequency, the idler frequency being the difference between the pump frequency and the signal frequency; and
   a nonlinear optical medium placed in the optical cavity on the optical axis for receiving the optical pump energy and producing energy along the optical axis at the signal frequency and the idler frequency.

14. The non-resonant optical parametric oscillator of claim 13, the optical cavity further including outcoupling means on the optical axis for coupling the energy at the signal frequency and the idler frequency from the optical cavity.

15. The non-resonant optical parametric oscillator of claim 14 wherein the outcoupling means comprises means for outcoupling optical energy having a predetermined polarization.

16. The non-resonant optical parametric oscillator of claim 15, further comprising means for rotating the polarization of optical energy at the signal frequency and the idler frequency by ninety degrees.

17. The non-resonant optical parametric oscillator of claim 14 wherein the outcoupling means comprises first and second optical elements, the first optical element being reflective for the signal energy and being transmissive for energy at the idler frequency, and the second optical element being reflective for energy at the idler frequency and being transmissive for the signal energy.

18. The non-resonant optical parametric oscillator of claim 17 wherein the first and second optical elements are highly transmissive to the optical pump energy.

19. The non-resonant optical parametric oscillator of claim 14 wherein the outcoupling means comprises the first and second optical elements, the first optical element being reflective for the signal energy and energy at the idler frequency, and the second optical element being transmissive for the signal energy and energy at the idler frequency.

20. The non-resonant optical parametric oscillator of claim 19 wherein the first and second optical elements are highly transmissive to the optical pump energy.

21. A non-resonant optical parametric oscillator for producing optical signal energy having a signal frequency from optical pump energy having a pump frequency, comprising:
    an optical cavity formed along an optical axis between first and second optical elements at respective first and second ends thereof, the first optical element further being reflective for the signal energy and being transmissive for energy at an idler frequency that is the difference between the pump frequency and the signal frequency, and the second optical element further being reflective for energy at the idler frequency and being transmissive for the signal energy, and
    a nonlinear optical medium placed in the optical cavity on the optical axis for receiving the optical pump energy and producing energy along the optical axis at the signal frequency and the idler frequency.

22. The non-resonant optical parametric oscillator of claim 21 wherein the first and second optical elements are highly transmissive to the optical pump energy.

23. A non-resonant optical parametric oscillator for producing optical signal energy having a signal frequency from optical pump energy having a pump frequency, comprising:
    an optical cavity formed along an optical axis between first and second optical elements at respective first and second ends thereof, the first optical element further being reflective for the signal energy and energy at an idler frequency that is the difference between the pump frequency and the signal frequency, and the second optical element further being transmissive for energy at the idler frequency and the signal energy, and
    a nonlinear optical medium placed in the optical cavity on the optical axis for receiving the optical pump energy and producing energy along the optical axis at the signal frequency and the idler frequency.

24. The non-resonant optical parametric oscillator of claim 23 wherein the first and second optical elements are highly transmissive to the optical pump energy.

25. A non-resonant optical parametric oscillator for producing optical signal energy having a signal frequency from optical pump energy having a pump frequency, comprising:
    an optical cavity including first and second optical elements at respective first and second ends thereof and having an optical axis between the ends and being non-resonant with energy at the signal frequency, energy at the pump frequency and energy at an idler frequency, the idler frequency being the difference between the pump frequency and the signal frequency,
    a nonlinear optical medium placed in the optical cavity on the optical axis for receiving the optical pump energy and producing energy along the optical axis at the signal frequency and the idler frequency, and
    outcoupling means placed in the optical cavity on the optical axis for outcoupling optical energy having a predetermined polarization from the optical cavity.

26. The non-resonant optical parametric oscillator of claim 25, further comprising means for rotating the polarization of optical energy at the signal frequency and the idler frequency by ninety degrees.

27. A laser system, comprising
    a source of optical pump energy having a pump frequency;
    an optical cavity including first and second optical elements at respective first and second ends thereof and having an optical axis between the ends and being non-resonant with both energy at a signal frequency and energy at an idler frequency, the idler frequency being the difference between the pump frequency and the signal frequency; and
    a nonlinear optical medium placed in the optical cavity on the optical axis for receiving the optical pump energy and producing energy along the optical axis at the signal frequency and the idler frequency.

28. The laser system of claim 27, the optical cavity further including outcoupling means on the optical axis for coupling the energy at the signal frequency and the idler frequency from the optical cavity.

29. The laser system of claim 28 wherein the outcoupling means comprises means for outcoupling optical energy having a predetermined polarization.

30. The laser system of claim 29, further comprising means for rotating the polarization of optical energy at the signal frequency and the idler frequency by ninety degrees.

31. The laser system of claim 28 wherein the outcoupling means comprises the first and second optical elements, the first and second optical elements being highly transmissive to the optical pump energy, the first optical element further being reflective for the signal energy and being transmissive for energy at the idler frequency, and the second optical element further being reflective for energy at the idler frequency and being transmissive for the signal energy.

32. The laser system of claim 28 wherein the outcoupling means comprises the first and second optical elements, the first and second optical elements being highly transmissive to the optical pump energy, the first optical element further being reflective for the signal energy and energy at the idler frequency, and the second optical element further being transmissive for energy at the idler frequency and the signal energy.

33. A non-resonant optical parametric oscillator for producing optical signal energy having a signal frequency from optical pump energy having a pump frequency, comprising:

optical feedback means for amplifying optical energy, including first and second optical elements at respective first and second ends thereof and having an optical axis aligned in first and second opposing directions between the ends, the optical feedback means being transmissive to energy at the signal frequency and to energy at an idler frequency, the idler frequency being the difference between the pump frequency and the signal frequency; and a nonlinear optical medium placed on the optical axis in the optical feedback means for receiving the optical pump energy and producing energy along the optical axis at the signal frequency and the idler frequency, the signal energy being transmitted in the first direction and then in the second direction and the energy at the idler frequency being transmitted in the second direction and then in the first direction.

34. The non-resonant optical parametric oscillator of claim 33 wherein the pump energy is transmitted through the nonlinear optical medium in one of the two directions and then in the other of the two directions.

35. The non-resonant optical parametric oscillator of claim 33, the optical feedback means further including outcoupling means on the optical axis for coupling the energy at the signal frequency and the idler frequency from the optical cavity.

36. The non-resonant optical parametric oscillator of claim 33 wherein the outcoupling means comprises first and second optical elements, the first optical element further being reflective for the signal energy and being transmissive for energy at the idler frequency, and the second optical element further being reflective for energy at the idler frequency and being transmissive for the signal energy.

37. The non-resonant optical parametric oscillator of claim 36 wherein the first and second optical elements are highly transmissive to the optical pump energy.

38. The non-resonant optical parametric oscillator of claim 33 wherein the outcoupling means comprises first and second optical elements, the first optical element further being reflective for the signal energy and the idler frequency, and the second optical element further being transmissive for energy at the idler frequency and the signal energy.

39. A laser system, comprising a source of optical pump energy having a pump frequency;

optical feedback means for amplifying optical energy including first and second optical elements at respective first and second ends thereof and having an optical axis between the ends and being non-resonant with both energy at a signal frequency and energy at an idler frequency, the idler frequency being the difference between the pump frequency and the signal frequency; and a nonlinear optical medium placed on the optical axis in the optical feedback means for receiving the optical pump energy and producing energy along the optical axis at the signal frequency and the idler frequency.

40. The laser system of claim 39, the optical feedback means further including outcoupling means on the optical axis for coupling the energy at the signal frequency and the idler frequency from the optical feedback means.

41. The laser system of claim 40 wherein the outcoupling means comprises means for outcoupling optical energy having a predetermined polarization.

42. The laser system of claim 41, further comprising means for rotating the polarization of optical energy at the signal frequency and the idler frequency by ninety degrees.

43. The laser system of claim 40 wherein the outcoupling means comprises first and second optical elements, the first and second optical elements being highly transmissive to the optical pump energy, the first optical element further being reflective for the signal energy and being transmissive for energy at the idler frequency, and the second optical element further being reflective for energy at the idler frequency and being transmissive for the signal energy.

44. The laser system of claim 40 wherein the outcoupling means comprises first and second optical elements, the first and second optical elements being highly transmissive to the optical pump energy, the first optical element further being reflective for the signal energy and energy at the idler frequency, and the second optical element further being transmissive for energy at the idler frequency and the signal energy.

* * * * *